United States Patent
Fujiwara et al.

(10) Patent No.: US 7,929,385 B2
(45) Date of Patent: Apr. 19, 2011

(54) OPTICAL PICKUP APPARATUS

(75) Inventors: Katsumi Fujiwara, Hachioji (JP);
Tatsuji Kurogama, Hachioji (JP);
Katsuya Yagi, Hino (JP); Hideyuki Fujii, Yoshikawa (JP)

(73) Assignee: Konica Minolta Opto, Inc., Tokyo (JP)

( * ) Notice: Subject to any disclaimer, the term of this patent is extended or adjusted under 35 U.S.C. 154(b) by 1490 days.

(21) Appl. No.: 11/175,129

(22) Filed: Jul. 5, 2005

(65) Prior Publication Data
US 2006/0013109 A1 Jan. 19, 2006

(30) Foreign Application Priority Data

Jul. 13, 2004 (JP) ................................. 2004-205780

(51) Int. Cl.
*G11B 7/00* (2006.01)
(52) U.S. Cl. ................. 369/44.22; 369/44.15; 369/44.16
(58) Field of Classification Search .......................... None
See application file for complete search history.

(56) References Cited

U.S. PATENT DOCUMENTS

| | | | | |
|---|---|---|---|---|
| 5,774,443 A | * | 6/1998 | Shibano | 369/103 |
| 6,728,179 B1 | * | 4/2004 | Nakano et al. | 369/53.1 |
| 7,372,785 B2 | * | 5/2008 | Lee et al. | 369/44.14 |

FOREIGN PATENT DOCUMENTS

| | | |
|---|---|---|
| JP | 2001-28147 | 1/2001 |
| JP | 2003-45068 | 2/2003 |

* cited by examiner

*Primary Examiner* — Van N Chow
(74) *Attorney, Agent, or Firm* — Cohen Pontani Lieberman & Pavane LLP

(57) ABSTRACT

An optical pickup apparatus for recording and/or reproducing information onto/or from information recording surface, the optical pickup apparatus comprises a laser light source, an objective lens for converging light beams from the laser light source onto the information recording surface through a protective layer of an optical information recording medium, an optical device for changing a divergence angle of incident light beams by moving in an optical axis direction, the optical device being arranged between the laser light source and the objective lens, a light receiving device for receiving light beams reflected by the information recording surface and passed through the objective lens, and a driving device capable of moving the optical device in a direction crossing the optical axis.

18 Claims, 8 Drawing Sheets

FIG. 9 (b)
FIG. 9 (d)
FIG. 9 (a)
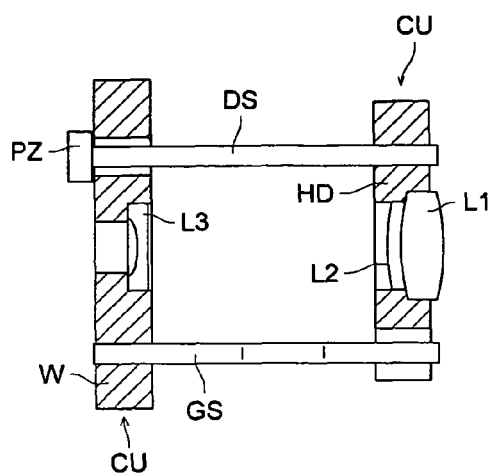
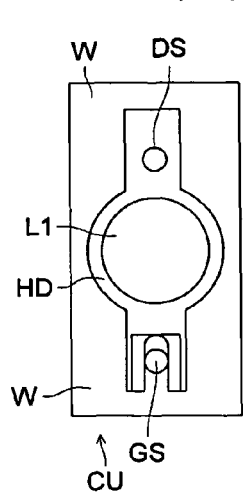
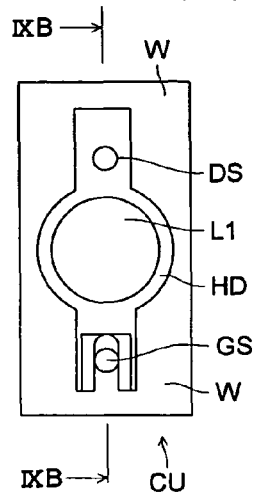
FIG. 9 (c)
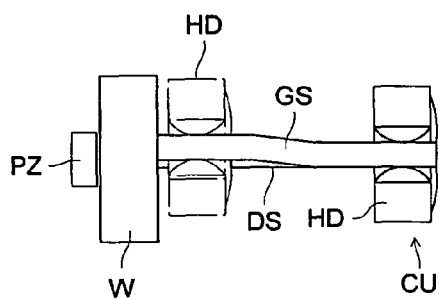
FIG. 10
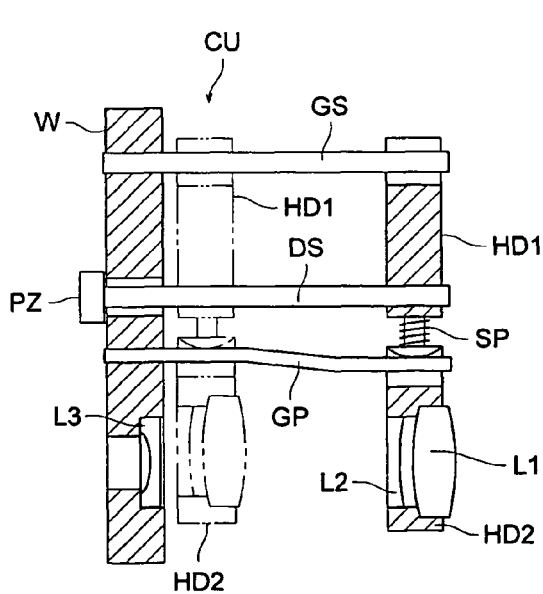
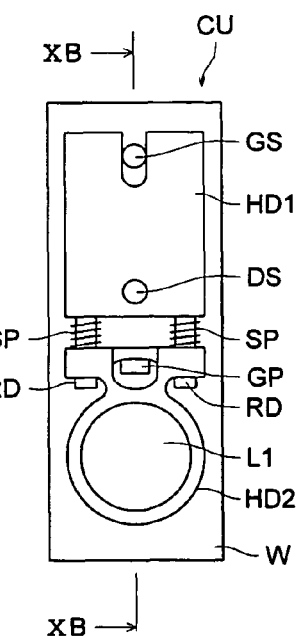

OPTICAL PICKUP APPARATUS

RELATED APPLICATION

This application claims priority from Japanese patent Application No. JP2004-205780 filed on Jul. 13, 2004, which is incorporated hereinto by reference.

TECHNICAL FIELD

The present invention relates to an optical pickup apparatus, particularly to an optical pickup apparatus capable of adequate recording/production of information using an optical information recording medium.

BACKGROUND

In recent years, there has been a rapid progress in the research and development of a high-density optical disc system capable of recording/reproduction of information using a blue-violet semiconductor laser having a wavelength of 400 nm. For example, a so-called Blue-ray Disc (BD), an optical disc for recording/reproduction of information based on the specification with a NA of 0.85 and a light source wavelength of 405 nm, which permits 20 through 30 GB information to be recorded on an 12 cm-diameter optical disc having the same size as a DVD (having a NA of 0.6, a light source wavelength of 650 nm and a storage capacity of 4.7 GB). A HD DVD, an optical disc for recording/reproduction of information based on the specification with a NA of 0.65 and a light source wavelength of 405 nm, permits 15 through 20 GB information to be recorded on an 12 cm-diameter optical disc. In the present specification, such an optical disc will be referred to as a "high-density optical disc".

It must be noticed that the sufficient value of an optical pickup apparatus as a commercial product is not provided by mere capability of adequate recording/reproduction of information using such a high-density optical disc. At present, the DVD and CD containing a great variety of information are displayed on the market. In view of this situation, mere capability of adequate recording/reproduction of information using a high-density DVD cannot meet the requirements of the market. For example, to provide capability of recording/reproducing the information using the prior art DVD or CD owned by a user is to improve the value of the commercial product as a compatible type optical pickup apparatus. Against this background, the optical system using a compatible type optical pickup apparatus is-required to provide adequate recording/reproduction of information using any of the high-density DVD, prior art DVD and CD, in addition to the advantages of low cost and simple structure. Further, an optical pickup apparatus capable of providing adequate recording/reproduction of information using the DVD and CD in a compatible mode has come into practical use. However, the current products are required to be reformed into downsized and low-profile versions.

Of the high-density optical discs, the BD uses a protective layer having a thickness of about 0.1 mm ("protective layer" in the sense in which it is used here refers to the transparent layer arranged on the side where the light beams are applied to the information recorded surface of the optical disc; also called "transparent substrate or protective layer"). This is intended to reduce the coma aberration resulting from the curvature of the optical disc and inclination when the objective lens uses a higher numerical aperture. However, this produces a big difference in the thickness of the protective layer between the CD (protective layer: 1.2 mm thick) and DVD (protective layer: 0.6 mm thick). Thus, it is necessary to ensure compatibility among these optical discs of various specifications, by using a common objective lens, without causing a substantial increase in costs. In this case, when using any type of the optical disc, the value of a product is higher if the wait time is shorter, the wait time being the time required to reach the enable status of recording/reproduction function, subsequent to loading an optical disc into the drive apparatus. Accordingly, the optical pickup apparatus is required to provide a high-speed compatibility function.

Another problem is that the adequate recording/reproduction of information is discouraged by spherical aberration caused by the difference in the thickness of protective layer. This spherical aberration occurs in proportion to the fourth power of the numerical aperture of the objective lens. In the case of a prior art CD or DVD having a smaller numerical aperture, the spherical aberration resulting from the thickness of the protective layer is sufficiently small. There has been no need of taking a special procedure for correcting the spherical aberration. By contrast, when the numerical aperture of the objective lens is as high as 0.85, for example, the tolerance in the thickness of the protective layer is very close on the order of several microns. When consideration is given to residual spherical aberration of the optical pickup apparatus and the volume productivity of the optical disc, the optical pickup apparatus is preferably provided with a spherical aberration correcting function. Further, when the error in the thickness of the protective layer of the optical disc has to be corrected on a real-time basis, a means for correcting spherical aberration is required to provide a high degree of responsibility.

In addition, when an objective lens is created using an objective lens subjected to a change in refraction index depending on temperature change, spherical aberration will deteriorate in response to the temperature change. This spherical aberration must also be corrected. In an optical pickup apparatus permitting recording/reproduction of information using different types of optical discs on a compatible basis, the aforementioned problems must be solved, and a compact and low-cost product must be provided.

Further, what is known in the prior art includes the so-called two-layer DVD where the storage capacity is almost doubled by alternate lamination of the protective layer and information recording layer from the same light beam entry side. Especially the next-generation optical disc system utilizes the objective lens of higher numerical aperture than that of the DVD. If recording/reproduction of information is intended using such a dual layered recording type optical disc, there is a big difference resulting from the difference in thickness in the range from the light beam entry side to each of the information recording layers, at the time of focus jumping between the information recording layers. Accordingly, in the next-generation optical disc system, the focusing of the objective lens as well as correction of the spherical aberration are essential at the time of focus jumping between information recording layers.

To solve the aforementioned problems, a condensing optical system has been proposed. This condensing optical system has a beam expander composed of positive and negative lenses, and one of these lenses is movable along the optical axis. However, the optical pickup apparatus is often installed in a very limited space. The problem with the optical pickup apparatus is how to drive the lens as a constituent of the beam expander, which provides a drive means. The Official Gazette of Japanese Patent Tokkai 2001-28147 discloses a structure of driving a combination lens using a voice coil motor. In the meantime, the Official Gazette of Japanese Patent Tokkai 2003-45068 discloses a structure of driving the relay lens using a stepping motor.

In this connection, the high-density optical disc, DVD and CD use different light source wavelengths, and a common light source cannot be utilized. Accordingly, in an optical pickup apparatus of compatible type, a light source must be arranged for each of them. By contrast, a so-called 2-laser 1-package has come on the market. In this system, two light emission points for emitting the light beams having different wavelengths are fixed in one heatsink. It is known that use of this system allows a compact configuration of the optical pickup apparatus.

However, the light emission points of this 2-laser 1-package are apart from each other at a distance of about 100 μm. When they are used as laser light sources of the optical pickup apparatus, if either of the light sources is adjusted to the reference optical axis of the optical pickup apparatus, another light source will be off the reference optical axis. When a laser beam is emitted from the emission point off the reference optical axis, a distance is created between the optical axis and the image point on the image surface. Especially in the objective lens for emitting the divergent light, a great amount of deterioration is caused by off-center characteristics. For example, coma aberration tends to occur at the time of tracking. Suck a problem is left unsolved.

Further, when the optical disc is curved due to heat and others, and is tilted with respect to the surface orthogonal to the optical axis, coma aberration also occurs to the optical spot. When the objective lens actuator of poor tilt characteristics is employed, the objective lens may tilt at the time of focusing and tracking. If the objective lens tilts, coma aberration tends to occur in the optical spot for an objective lens with priority placed on distance between the optical axis and the image point (design impervious to lens shift). Suck a problem is left unsolved.

To meet the high-speed rotation of the recording type DVD, efforts have been made to increase the laser power. The high-power laser is generally characterized by a higher threshold value. If an attempt is made to use it for regeneration as well and to apply the lower-power laser beam, noise tends to increase. In this manner, handling of the laser light source is anticipated to become difficult in future. In case of a high power laser meeting the current rotational speed, there is no special problem when used with the power controlled, even at the time of low power for DVD regeneration. A 2-laser 1-package type laser light source equipped with a high power laser for recording and a low power laser for scanning is expected to come on the market to provide measures for solving the aforementioned problem anticipated when laser power is further increased in future. However, the problem is how to control the coma aberration caused by deviation of the light source from the axis in such a laser light source. In the aforementioned beam expander, the coma aberration cannot be corrected. This makes it necessary to install an independent structure for correcting coma aberration, and hence raises a problem of an increased size of the optical pickup apparatus.

In the meantime, it is known that coma aberration can be corrected by shifting the optical device in the direction orthogonal to optical axis. When the optical device is to be shifted in the direction orthogonal to optical axis for the purpose of correcting the coma aberration, a voice coil motor disclosed in the Official Gazette of Japanese Patent Tokkai 2001-28147 can be used as a drive means. This will provide the benefit of increased response speed. However, the voice coil motor is intended to move a movable section in the form of a circular arc. When the optical device mounted on the movable section is moved a considerable distance in the direction orthogonal to the optical axis, it may be moved in the unintended direction of optical axis. This may cause deterioration of the spherical aberration. Further, for the very nature of the voice coil motor, current must be applied continuously to hold the optical device at the home position. This will raise the problem of increased power consumption. This problem tends to occur especially in a battery-driven apparatus such as a notebook PC. Another problem is found in the high cost of the voice coil motor.

On the other hand, when the stepping motor disclosed in the Official Gazette of Japanese Patent Tokkai 2003-45068 is used as a drive means, the movable section can be shifted in a straight line, and the cost is comparatively low. However, when one wishes to get high resolution required for the control of the optical pickup apparatus, the response speed will be reduced. Further, the stepping motor involves a vibration problem and loss of synchronism wherein conformance to input pulses fails when torque for the load is insufficient. Generally, the stepping motor is large-sized, and hence the installation site will be limited.

SUMMARY

In view of the prior art described above, it is an object of the present invention to provide an optical pickup apparatus, capable of high-precision and high-speed correction of spherical aberration, characterized by compact configuration, low power consumption and comparatively low cost.

A first embodiment of the present invention is an optical pickup apparatus, for recording/reproduction of information using the information recording surface, comprising:

a laser light source;

an objective lens for condensing the light beams from the laser light source onto an information recording surface through the protective layer of an optical information recording medium;

an optical device, arranged between the laser light source and objective lens, for changing the divergence angle of the light beams applied by moving in the direction of optical axis and for emitting the light beams;

a light receiving section for receiving the light beams reflected by the information recording surface and passed through the objective lens; and a drive section capable of moving the optical device in the direction crossing the optical axis.

According to the present invention, the spherical aberration resulting from the difference in the thickness of the protective layer of an optical device is corrected by moving the aforementioned optical device constituting a collimator and beam expander, for example, in the direction of the optical axis. Further, the coma aberration resulting from the emission point of the light source being deviated from the optical axis is corrected by moving the aforementioned optical device in the direction crossing the optical axis. Accordingly, even if the specification is different, the present invention provides an optical pickup apparatus capable of adequate recording/reproduction of information. However, when only the correction of spherical aberration is required, the optical device can be moved only in the direction of optical axis. If only correction of the coma aberration is required, the optical device can be moved only in the direction orthogonal to the optical axis. In the present specification, "a change of the divergence angle of light beams" refers to a change of the parallelism of light beams. To put it more specifically, it refers to a change of the divergent or convergent angle of the outgoing light beams with respect to the divergence angle of the incoming light beams or the convergent angle (including the case of angle=0). Accordingly, the light beams include divergent, parallel and convergent light beams. Further, "a laser light source equipped with a plurality of emission points" includes a plurality of laser light sources having a single or a plurality of emission points, in addition to the laser light source with a plurality of emission points incorporated in one package.

An example of using the emission point arranged apart from the optical axis includes the case where the emission point of the light source containing a single emission point is located outside the optical axis, in addition to the case where the light source has a plurality of emission points incorporated in one package. It further includes the case where the emission point is off the optical axis due to the mechanical error of the light source position, and the case where the emission point is intentionally deviated from the optical axis in order to improve the degree of freedom in the optical design.

A second embodiment of the present invention is the optical pickup apparatus described in the first embodiment wherein the aforementioned drive section comprises:

an electromechanical transducer device, a drive member secured on one end of the electromechanical transducer device; and a movable member, connected to the optical device, held movably on the drive member;

wherein the aforementioned movable member is moved by the repeated operation of expansion and contraction of the aforementioned electromechanical transducer device at speeds different in the direction of elongation and in the direction of contraction.

In the drive section, the electromechanical transducer device can be deformed to make a slight expansion and contraction by applying a drive voltage such as a pulse of sawtooth waveform to electromechanical transducer device for a very short time. The expansion and contraction speeds can be changed by the configuration of the pulse. When the electromechanical transducer device is deformed at a high speed in the direction of elongation or in the direction of contraction, the movable member is kept at the present position by the inertia of the mass, without conforming to the operation of the drive member. In the meantime, when the electromechanical transducer device is deformed in the opposite direction at a lower speed, the movable member moves by conforming to the operation of the drive member by the friction produced during this time. Thus, the movable member is moved continuously in one direction by the repetition of expansion and contraction by the electromechanical transducer device. To be more specific, the optical device connected to the movable member can be moved at a high speed, by using the drive section of the present invention characterized by a high degree of responsibility. Further, movement by a very small distance is also performed. Further, in the case of holding the movable member at the home position, when the supply of power to the electromechanical transducer device is suspended, the movable member can be held by the friction produced between the movable member and drive member, resulting in power saving. In addition, the drive section is characterized by a simple structure, compact configuration and low cost. Thus, the present invention provides an optical pickup apparatus capable of high-precision and high-speed correction of the coma aberration by movement of the optical device arranged between the laser light source and objective lens, in the direction crossing the optical axis. Further, this optical pickup apparatus is characterized by compact configuration, low power consumption and comparatively low cost.

A third embodiment of the present invention is the optical pickup apparatus described in the first or second embodiment wherein the aforementioned optical device includes at least one lens, and the divergence angle of the light beams entering the objective lens is changed by moving this lens, thereby ensuring adequate correction of the spherical aberration.

A fourth embodiment of the present invention is the optical pickup apparatus described in any one of the first through third embodiments, wherein the aforementioned laser light source includes a plurality of emission points comprising at least one emission point arranged apart from the optical axis; wherein the light beams having mutually different wavelengths are emitted from the aforementioned plurality of emission point; and wherein light beams are each condensed on the information recording surfaces of the optical information recording media having mutually different recorded information densities, whereby recording/reproduction of information is carried out.

The aforementioned laser light source includes a plurality of emission points fixed onto a common heatsink. If drive operation is performed to move the optical device in response to switching of the emission point for applying a laser beam, the optical pickup apparatus can be downsized, and at the same time, the laser light source emitting the light beams having different wavelengths can be used to allow recording/reproduction of information to be performed, using the optical information recording media of different types. In this sense, this arrangement is preferred. What is meant by "heatsink" in this case refers to the member HS or the like, in the two-wavelength 1-package LD shown in FIG. 6, that supports the light emission section LP capable of emitting two light beams on the stem ST through a sub-mount SM. Examples of such a 2-wavelength 1-package LD are disclosed in the Official Gazette of Japanese Patent Tokkai 2001-215425. When the sub-mount SM is directly mounted on the stem ST, the sub-mount SM will serve as a heatsink. Further, the stem ST is located at a raised position. When the light emission section LP is mounted directly there, the stem ST will act as a heatsink. In this case, however, what contains a plurality of emission points having one and the same laser light source is also included.

A fifth embodiment of the present invention is the optical pickup apparatus described in fourth embodiment, wherein the aforementioned plurality of emission points emit the light beams having at least two wavelengths out of:

the light beams, having a first wavelength $\lambda 1=380$ nm through 450 nm, for recording/reproduction of information using the first optical information recording medium having a protective layer thickness $t1=0.09$ through 0.11 or 0.55 through 0.65;

the light beams, having a second wavelength $\lambda 2=600$ nm through 700 nm, for recording/reproduction of information using the second optical information recording medium having a protective layer thickness $t2=0.55$ through 0.65; and the light beams, having a third wavelength $\lambda 3=750$ nm through 850 nm, for recording/reproduction of information using the first optical information recording medium having a protective layer thickness $t3=1.1$ through 1.3.

This arrangement ensures adequate recording/reproduction of information using different types of optical information recording media.

A sixth embodiment of the present invention is the optical pickup apparatus described in any one of the first through fifth embodiments, further comprising a signal output section for receiving the light beams reflected from the information recording surface of the optical information recording medium, and for outputting the signal on the spherical aberration of the spot where an image is formed on the information recording surface of the optical information recording medium, wherein the aforementioned drive section performs a drive operation to move the optical device in response to the signal on the spherical aberration outputted from the aforementioned signal output section. Accordingly, the optical device is moved by the amount corresponding to the spherical aberration having occurred, whereby more adequate correction of the spherical aberration is provided. Although detailed explanation is omitted here, a technique of detecting a change in the spherical aberration using the light reflected from the optical information recording medium is disclosed in the Official Gazette of WO02/2520 and the Official Gazette of Japanese Patent Tokkai 2000-182254. This technique can be utilized for the present purpose. This arrangement permits feedback control in the correction of spherical aberration, hence real-time correction of spherical aberration.

What is meant by "signal on the spherical aberration" may include the signal representing the degree of spherical aberration or relative value, without being restricted to the signal representing the amount of spherical aberration expressed in units of arms in the strict sense of the word. The term "signal on the spherical aberration" also may include a signal for detecting the individual factor causing the spherical aberration, for example, a signal for detecting an optical disc thickness error that may result in spherical aberration.

A seventh embodiment of the present invention is the optical pickup apparatus described in any one of the first through sixth embodiments, wherein, in response to switching of the emission point for applying a laser beam, the drive section performs the drive operation in such a way as to move at least one of the lenses of the optical device in the direction of optical axis and in the direction orthogonal to the optical axis simultaneously. This arrangement provides simultaneous correction of spherical aberration and coma aberration.

A eighth embodiment of the present invention is the optical pickup apparatus described in any one of the first through sixth embodiments, wherein, in response to switching of the emission point for applying a laser beam, the drive section performs the drive operation in such a way as to move at least one of the lenses of the optical device, so that, with reference to the position prior to the movement of at least one lens of the optical device, the position subsequent to movement is moved in the direction of optical axis and in the direction orthogonal to the optical axis. This arrangement permits high-speed correction of spherical aberration and coma aberration to be completed in one operation. Such movement includes all forms of movement, exemplified by a straight line (including the L-shaped locus) formed by the locus of the optical device and a curve (including the S-shaped locus).

A ninth embodiment of the present invention is an optical pickup apparatus, for recording/reproduction of information using the information recording surface, comprising:

a laser light source equipped with a plurality of emission points containing at least one emission point located apart from the optical axis;

an objective lens for condensing the light beams from the laser light source onto an information recording surface through the protective layer of an optical information recording medium;

an optical device, arranged between the laser light source and objective lens, for changing the divergence angle of the light beams applied by moving in the direction of optical axis and for emitting the light beams;

a light receiving section for receiving the light beams reflected by the information recording surface and passed through the objective lens; and a drive section for moving the optical device in the direction orthogonal to the optical axis;

wherein the drive section is composed of an electromechanical transducer device, a drive member fixed to one end of the electromechanical transducer device, and a movable member connected to the optical device and movably held on the drive member; and wherein the movable member is moved by repeated expansion and contraction of the electromechanical transducer device at speeds different in the directions of contraction and expansion.

According to the present invention, adequate correction of coma aberration is achieved by driving the optical device in the direction orthogonal to the optical axis and changing the direction of emission of the light beams thereby. In particular, by using a drive section of the present invention characterized by a high degree of responsibility, the optical device connected to the movable member can be moved at a high speed, and further it can be moved by a very small amount. Moreover, in the case of holding the movable member at the home position, when the supply of power to the electromechanical transducer device is suspended, the movable member can be held by the friction produced between the movable member and drive member, resulting in power saving. In addition, the drive section is characterized by a simple structure and compact configuration, plus a low cost. Thus, in an optical pickup apparatus, high-precision and high-speed correction of coma aberration can be achieved by the process wherein the optical device arranged between the laser light source and objective lens is driven in the direction orthogonal to the optical axis. This arrangement provides an optical pickup apparatus characterized by compact configuration, reduced power consumption and comparatively low cost.

A tenth embodiment of the present invention is an optical pickup apparatus comprising a signal output section for receiving the light beams reflected from the information recording surface of the optical information recording medium, and for outputting the signal on the coma aberration of the spot where an image is formed on the information recording surface of the optical information recording medium. The drive section performs a drive operation to move the optical device in response to the signal on the coma aberration outputted from the aforementioned signal output section. Accordingly, the optical device is moved by the amount corresponding to the coma aberration having occurred, whereby more adequate correction of the coma aberration is provided. Although detailed explanation is omitted here, a technique of detecting a change in the coma aberration using the light reflected from the optical information recording medium is disclosed in the Japanese Journal of Applied Physics Vol. 38 (1999) pp 1744-1749. This technique can be utilized for the present purpose. This arrangement permits feedback control in the correction of coma aberration, hence real-time correction of coma aberration.

What is meant by "signal on the coma aberration" may include the signal representing the degree of coma aberration or relative value, without being restricted to the signal representing the amount of coma aberration expressed in units of $\lambda$rms in the strict sense of the word. The term "signal on the coma aberration" also may include a signal for detecting the individual factor causing the coma aberration, for example, a signal for detecting the switching operation among a plurality of emission points and the tilt angle of the optical disc.

A eleventh embodiment of the present invention is the optical pickup apparatus described in the ninety or tenth embodiment of the present invention, wherein, in response to switching of the emission point for applying a laser beam, the drive section performs the drive operation in such a way as to move at least one of the lenses of the optical device in the direction orthogonal to the optical axis. This arrangement permits adequate correction of coma aberration resulting from switching of the emission point.

A twelfth embodiment of the present invention is the optical pickup apparatus described in any one of the first through eleventh embodiments, wherein the aforementioned optical device is a collimate lens or a group of collimate lenses for changing the divergence angle of the light beams emitted from the laser light source.

A thirteenth embodiment of the present invention is the optical pickup apparatus described in any one of the first through eleventh embodiments, wherein the aforementioned optical device is a zoom collimate lens or a group of zoom collimate lenses for converting the light beams of divergent light emitted from the laser light source, into approximately parallel light, and further for changing the light beams diameter.

A fourteenth embodiment of the present invention is the optical pickup apparatus described in any one of the first through eleventh embodiments, wherein the aforementioned optical device is an expander lens or a group of expander lenses for increasing the light beams diameter of the incoming parallel light.

A fifteenth embodiment of the present invention is the optical pickup apparatus described in any one of the first through eleventh embodiments, wherein the aforementioned optical device is a zoom expander lens or a group of zoom expander lenses for increasing or reducing the light beams diameter of the incoming parallel light.

A sixteenth embodiment of the present invention is the optical pickup apparatus described in any one of first through fifteenth embodiments, wherein the aforementioned optical device changes the distribution of the rim intensity of the aforementioned optical spot.

When using a laser light source of 2-wavelength 1-package equipped with a high power laser for recording and a low power laser for scanning, for example, jittering characteristics may deteriorate under the influence of using a high power light source. To solve these problems, the aforementioned condensing state variable mechanism is used to drive the optical device of a zoom collimate lens capable of modifying the light beams coming from the laser light source, into parallel light, and changing the light beams diameter of the parallel light. Thus, the rim intensity is reduced at the time of recording to improve emission efficiency and is increased at the time of scanning to improve jittering characteristics. To put it more specifically, the emission efficiency of the objective lens is increased at the time of recording, and therefore, the light beams diameter of parallel light is reduced. In this case, the optical device or the like is driven in the direction of optical axis to adjust the diameter of the light beams. In the meantime, the jitter characteristics are improved by reducing the optical spot diameter at the time of scanning, and therefore, rim intensity is increased. This means that the light beams diameter of parallel light is increased. In this case, the optical device or the like is driven in the direction of optical axis to adjust the diameter of the light beams. Further, the lower power emission point is deviated from the reference optical axis. Coma aberration tends to occur due to this deviation. To correct the coma aberration, the optical device or the like is driven in the direction orthogonal to the optical axis.

An optical pickup apparatus of the seventeenth embodiment is the invention described in any one of first through sixteenth embodiments, wherein an anchoring member is provided so that the moving lens of the optical device will hit the anchoring member at the end of the traveling range. This arrangement ensures the moving lens to be held in a stable position by hitting the anchoring member.

For the light beams coming from at least one emission point, assume the case of using an optical pickup apparatus, having only a reproduction function, without any need for high-precision correction of spherical aberration. In this case, the lens is hit against the anchoring member in response to the light source wavelength and can be used at that position. This arrangement provides simplified control of the drive section. Further, if the position of the anchoring device is arranged at the time of assembling the optical pickup apparatus so that it can be adjustable, it is possible to correct, at the time of assembling, the difference in the spherical aberration of each optical pickup apparatus resulting from the difference in the inherent spherical aberration of each objective lens and other optical parts. This method provides simplified control since it eliminates the need of taking care of the spherical aberration of each optical pickup apparatus at the time of actual operation.

An eighteenth embodiment of the present invention is an optical pickup apparatus, for recording/reproduction of information using the information recording surface, comprising:

a laser light source equipped with a plurality of emission points containing at least one emission point located apart from the optical axis;

an objective lens for condensing the light beams from the laser light source onto an information recording surface through the protective layer of an optical information recording medium;

an optical device, arranged between the laser light source and objective lens, for changing the divergence angle of the light beams applied by moving in the direction of optical axis and for emitting the light beams; and a light receiving section for receiving the light beams reflected by the information recording surface and passed through the objective lens;

wherein the laser light source is moved in the direction orthogonal to the optical axis.

According to the present invention, when a 2-laser 1-package is used as a laser light source for example, the coma aberration caused by deviation of at least one emission point from the optical axis of the optical pickup apparatus can be adequately corrected by the movement of the laser light source per se in the direction orthogonal to the optical axis.

A nineteenth embodiment of the present invention is the optical pickup apparatus described in the eighteenth embodiment wherein the aforementioned drive section comprises:

an electromechanical transducer device, a drive member secured on one end of the electromechanical transducer device; and a movable member, connected to the optical device, held movably on the drive member;

wherein the aforementioned movable member is moved by the repeated operation of expansion and contraction of the aforementioned electromechanical transducer device at speeds different in the direction of elongation and in the direction of contraction.

By using a drive section of the present invention characterized by a high degree of responsibility, the light source connected to the movable member can be moved at a high speed, and further it can be moved by a very small amount. Moreover, in the case of holding the movable member at the home position, when the supply of power to the electromechanical transducer device is suspended, the movable member can be held by the friction produced between the movable member and drive member, resulting in power saving. In addition, the drive section is characterized by a simple structure and compact configuration, plus a low cost. Thus, in an optical pickup apparatus, high-precision and high-speed correction of coma aberration can be achieved by the process wherein the aforementioned laser light source is driven in the direction orthogonal to the optical axis. This arrangement provides an optical pickup apparatus characterized by compact configuration, reduced power consumption and comparatively low cost.

A twentieth embodiment of the present invention is the optical pickup apparatus described in the eighteenth or nineteenth embodiment, wherein, in response to switching of the emission point for applying a laser beam, the drive section performs the drive operation in such a way as to move the laser light source in the direction orthogonal to the optical axis.

A twenty first embodiment of the present invention is the optical pickup apparatus described in any one of the eighteenth through twentieth embodiments, wherein an anchoring member is provided so that the laser light source will hit the anchoring member at the end of the traveling range. This arrangement ensures the laser light source to be held in a stable position by hitting the anchoring member.

A twenty second embodiment of the present invention is the optical pickup apparatus described in any one of the second, seventeenth, nineteenth and twenty first embodiments, wherein the aforementioned electromechanical transducer device is a piezoelectric device. This arrangement provides a low-cost optical pickup apparatus.

The term "lens" appearing in the specification refers to the lens made of hologram or a diffraction grating and GRIN lens, as well as the lens having a curved surface such as polished glass or molded plastic lens. These lenses need not provide an image forming performance. They are sufficient when they can refract the incoming light and emit it so as to change the divergence angle of the light having entered the optical device constituted by the lens and to emit the resultant light.

The present invention provides an optical pickup apparatus, capable of high-precision and high-speed correction of aberration, characterized by compact configuration, reduced power consumption and comparatively low cost.

BRIEF DESCRIPTION OF THE DRAWINGS

FIG. 9(a) through FIG. 9(d) are drawings representing the front view of an optical system unit CU as still another embodiment of the present invention; wherein FIG. 9(b) is a view representing the configuration of FIG. 9(a) taken along the line IXB-IXB as viewed in the arrow-marked direction, and FIG. 9(c) is a side view of the optical system unit CU;

FIG. 10(a) is a front view of an optical system unit CU as a still further embodiment of the present invention, and FIG. 10(b) is a view representing the configuration of FIG. 10(a) taken along the line XB-XB as viewed in the arrow-marked direction;

DESCRIPTION OF THE PREFERRED EMBODIMENTS

Figure 1:
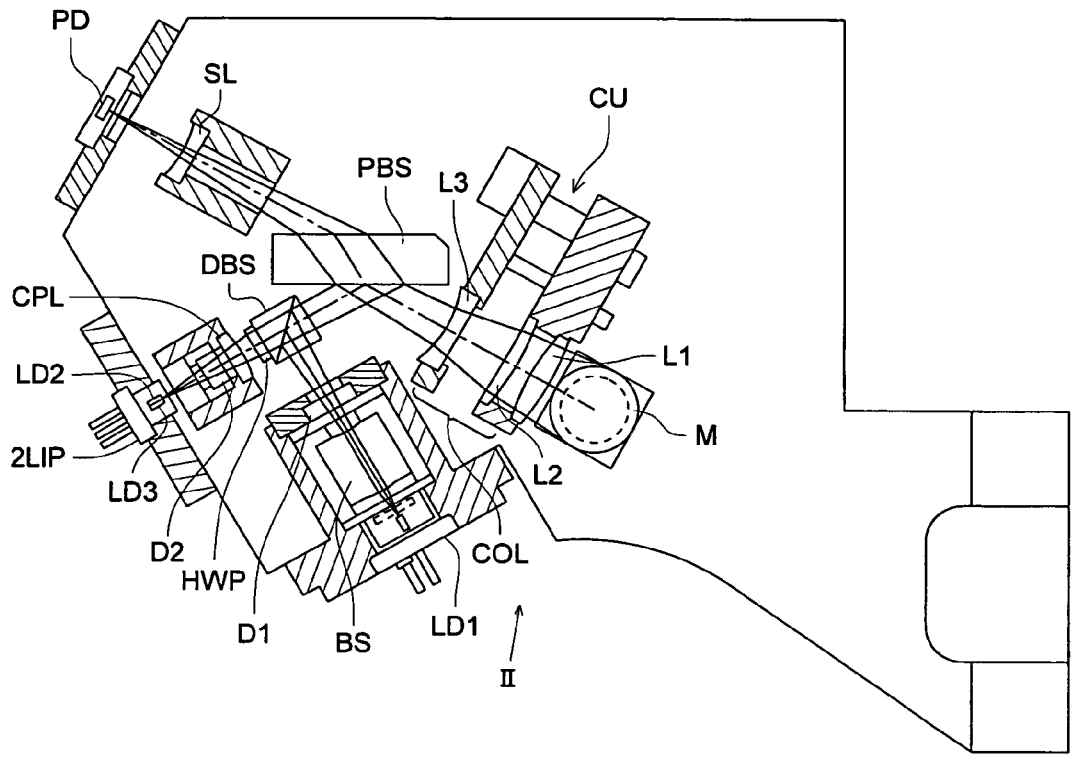
FIG. 1 is a top view schematically showing the configuration of an optical pickup apparatus as a first embodiment of the present invention.
Figure 2:
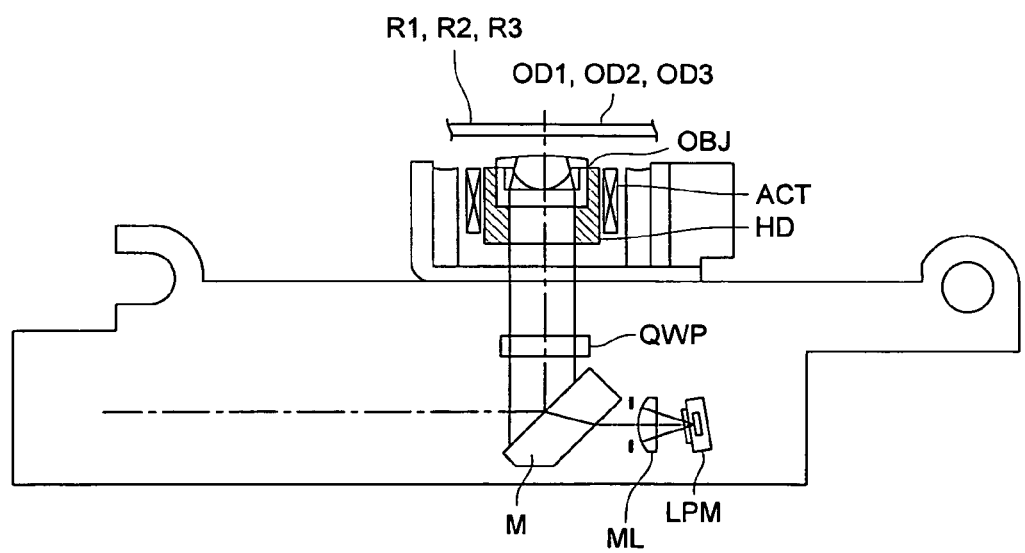
FIG. 2 is a drawing representing the configuration of FIG. 1 viewed in the arrow-marked direction II.

The following describes the embodiment of the present invention with reference to drawings: FIG. 1 is a top view schematically showing the configuration of an optical pickup apparatus as the present embodiment capable of adequate recording/reproduction of information using a BD or HD, DVD, DVD and CD as optical information recording medium (also called the optical disc). FIG. 2 is a drawing representing the configuration of FIG. 1 viewed in the arrow-marked direction II. The present embodiment includes an objective lens OBJ as a condensing optical system and collimator optical system COL. Further, the present embodiment uses the so-called 2-laser 1-package composed of the second semiconductor laser LD2 as a second light source and third semiconductor laser LD3 as a third light source incorporated in one and the same package or fixed to one and the same heatsink. In this case, a semiconductor laser may be arranged as a separate unit.

In the case of recording/reproduction of information using a first optical disc OD1 (for example, BD or HD, DVD), the light beams emitted from the first semiconductor laser LD1 (first light source) having a light source wavelength of 380 nm through 450 nm is shaped by a beam shaping device BS in the optical pickup apparatus given in FIG. 1. Then the light beams passes through the first diffraction device D1 again, whereby the light beams are separated into a main beam for recording and reproduction and a sub-beam for tracking error signal detection. After that, these beams are reflected by a dichroic beam splitter DBS and is again reflected by a polarized beam splitter PBS. Passing through the collimator optical system COL, the beams are converted into parallel light beams, which then enter the rising mirror M. The operation of the collimator optical system COL as a divergence change means will be described later.

In FIG. 2, part of the light beams entering the rising mirror passes through this mirror, and then passes through the monitor lens ML. Then the light beams enters a laser power monitor LPM to be used to monitor the laser power. In the meantime, the remaining portion of the light beams having entered the rising mirror is reflected there and passes through a quarter wave plate QWP. Then it enters the objective lens OBJ (composed of two devices in the present embodiment, but may be composed of one), from which it is condensed on the information recording surface R1 (protective layer: 0.1 mm or 0.6 mm thick) of the optical disc OD1.

The reflected light beams having been modulated by information bit on the information recording surface R1 again passes through the objective lens OBJ and quarter wave plate QWP, and is reflected by the rising mirror. Then passing through the collimator optical system COL, it further passes through the polarized beam splitter PBS and is condensed on the light receiving surface of the light detector PD (light receiving means; the same hereafter) by the sense lens SL. The information scan signal recorded on the optical disc OD1 is obtained using the output signal of the light detector PD.

A change in the amount of light resulting from a change of the spot in shape and position on the light detector PD is detected, and focusing and tracking are detected. Based on the result of these detections, the focusing actuator and tracking actuator of the objective lens actuator mechanism ACT allow the objective lens OBJ integrally with the lens holder HD to be moved in such a way that the light beams from the first semiconductor laser LD1 will form an image correctly formed on the information recording surface R1 of the optical disc OD1.

In the case of recording/reproduction of information using the second optical disc OD2 (e.g. DVD), the light beams emitted from the second semiconductor laser LD2 having a light source wavelength of 600 nm through 700 nm goes out from the 2-laser 1-package and is then passes through the second diffraction device D2, whereby the light beams are separated into a main beam for recording and reproduction and a sub-beam for tracking error signal detection. After that, the and divergent angle thereof is adjusted by a coupling lens CPL. After passing through the half-wave plate HWP and dichroic beam splitter DBS, the beams are reflected by a polarized beam splitter PBS. Passing through the collimator optical system COL, the beams are converted into parallel light beams, which then enter the rising mirror M.

In FIG. 2, part of the light beams entering the rising mirror passes through this mirror, and then passes through the monitor lens ML. Then the light beams enters a laser power monitor LPM to be used to monitor the laser power. In the meantime, the remaining portion of the light beams having entered the rising mirror is reflected there and passes through a quarter wave plate QWP. Then it enters the objective lens OBJ, from which it is condensed on the information recording surface R2 (protective layer: 0.6 mm thick) of the optical disc OD2.

The reflected light beams having been modulated by an information bit on the information recording surface R2 again passes through the objective lens OBJ and quarter wave plate QWP, and is reflected by the rising mirror. Then passing through the collimator optical system COL, it further passes through the polarized beam splitter PBS and is condensed on the light receiving surface of the light detector PD by the sense lens SL. The information scan signal recorded on the optical disc OD2 is obtained using the output signal of the light detector PD.

A change in the amount of light resulting from a change of the spot in shape and position on the light detector PD is detected, and focusing and tracking are detected. Based on the result of these detections, the focusing actuator and tracking actuator of the objective lens actuator mechanism ACT allow the objective lens OBJ integrally with the lens holder HD to be moved in such a way that the light beams from the second semiconductor laser LD2 will form an image correctly formed on the information recording surface R2 of the optical disc OD2.

In the case of recording/reproduction of information using the third optical disc OD3 (e.g. CD), the light beams emitted from the second semiconductor laser LD3 having a light source wavelength of 750 nm through 850 nm goes out from the 2-laser 1-package and is then passes through the second diffraction device D2, whereby the light beams are separated into a main beam for recording and reproduction and a sub-beam for tracking error signal detection. After that, the and divergent angle thereof is adjusted by a coupling lens CPL. After passing through the half-wave plate HWP and dichroic beam splitter DBS, the beams are reflected by a polarized beam splitter PBS. Passing through the collimator optical system COL, the beams are converted into parallel light beams, which then enter the rising mirror M.

In FIG. 2, part of the light beams entering the rising mirror passes through this mirror, and then passes through the monitor lens ML. Then the light beams enters a laser power monitor LPM to be used to monitor the laser power. In the meantime, the remaining portion of the light beams having entered the rising mirror is reflected there and passes through a quarter wave plate QWP. Then it enters the objective lens OBJ, from which it is condensed on the information recording surface R3 (protective layer: 1.2 mm thick) of the optical disc OD3.

The reflected light beams having been modulated by an information bit on the information recording surface R3 again passes through the objective lens OBJ and quarter wave plate QWP, and is reflected by the rising mirror. Then passing through the collimator optical system COL, it further passes through the polarized beam splitter PBS and is condensed on the light receiving surface of the light detector PD by the sense lens SL. The information scan signal recorded on the optical disc OD3 is obtained using the output signal of the light detector PD.

A change in the amount of light resulting from a change of the spot in shape and position on the light detector PD is detected, and focusing and tracking are detected. Based on the result of these detections, the focusing actuator and tracking actuator of the objective lens actuator mechanism ACT allow the objective lens OBJ integrally with the lens holder HD to be moved in such a way that the light beams from the third semiconductor laser LD3 will form an image correctly formed on the information recording surface R3 of the optical disc OD3.

Figure 3:
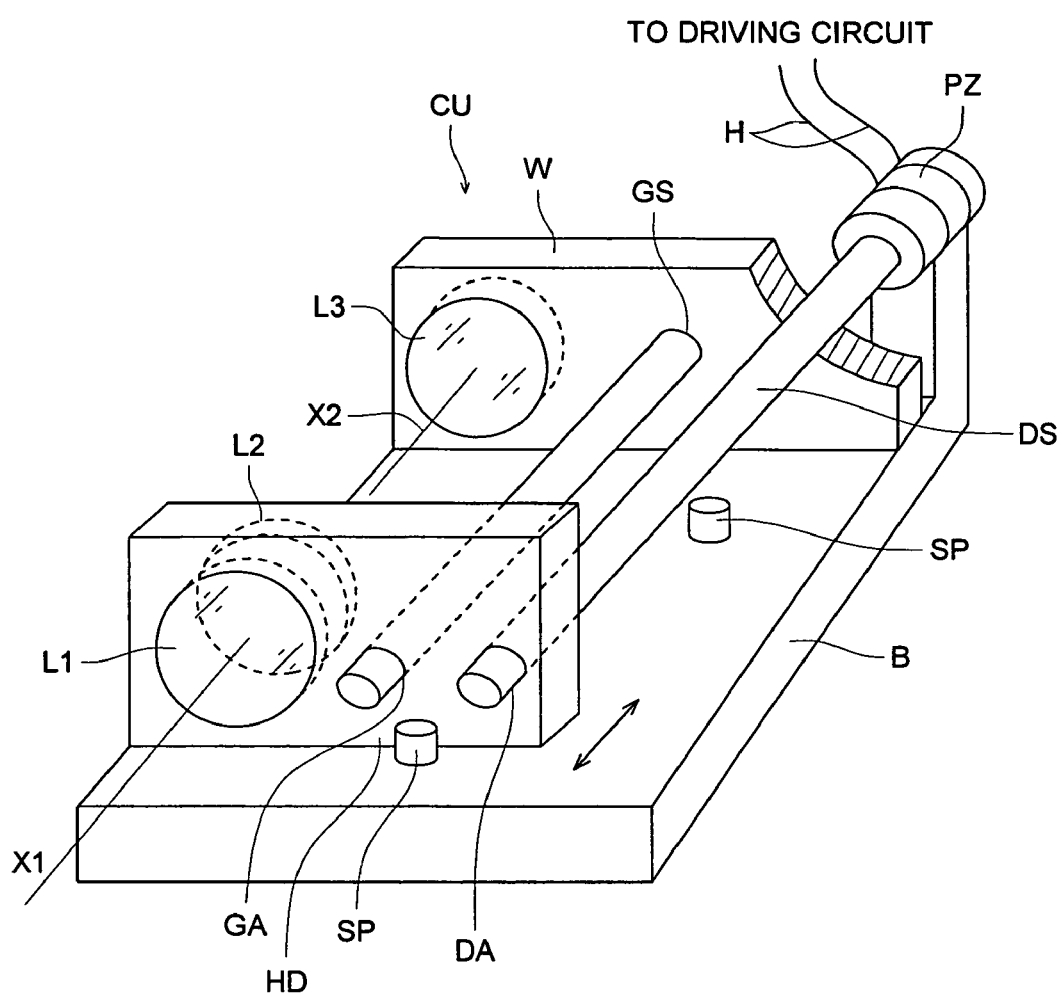
FIG. 3 is a perspective view of the optical system unit CU incorporating a collimator optical system COL and a drive section thereof as one integral unit.

FIG. 3 is a perspective view of the optical system unit CU incorporating a collimator optical system COL and a drive section thereof as one integral unit. In FIG. 3, a wall W is formed on the top surface of a base B. The guide shaft GS provided on the wall W (a partially cutaway view) extends along the base B. The opening formed on the wall W is equipped with a lens L3.

Figure 4:
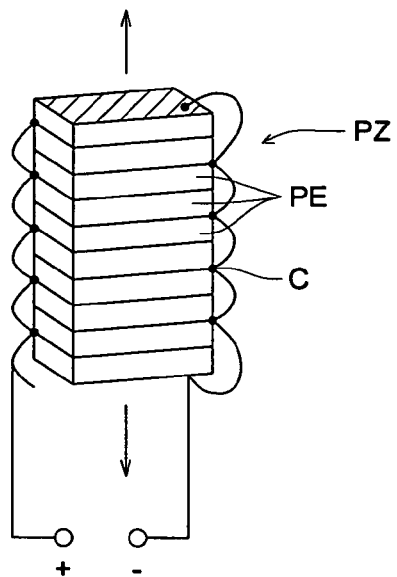
FIG. 4 is a perspective view representing a laminate type piezoelectric actuator PZ formed by laminating a plurality of piezoelectric ceramics PE with electrodes C connected in parallel therebetween.

The rear end of the piezoelectric actuator PZ as an electro-mechanical transducer device is mounted on the base B. The piezoelectric actuator PZ is formed by lamination of piezoelectric ceramic made of PZT (lead zirconate titanate). The piezoelectric ceramic is characterized by lack of agreement between the centers of gravity of positive and positive charges in the crystal lattice thereof. The piezoelectric ceramic per se is polarized, and tends to elongate when voltage is applied in the direction of polarization. However, the distortion of the piezoelectric ceramic in this direction is very small, and this distortion is insufficient to drive the driven member. As shown in FIG. 4, a lamination type actuator PZ is proposed as a commercial product, wherein this PZ is formed by lamination of a plurality of piezoelectric ceramics, between which electrodes C are connected in parallel. In the present embodiment, this lamination type actuator PZ is used as a drive source.

A drive shaft DS as a driven member is mounted on the front end of the piezoelectric actuator PZ. The drive shaft DS penetrates the wall W and is engaged with the drive aperture DA of the lens holder HD as a movable member through appropriate friction.

The lens holder HD composed of the lenses L1 and L2 as optical devices inserted coaxially into an opening is guided by a guide shaft GS inserted into the guide aperture GA so that it can travel on the base B. The axial line X1 of the lenses L1 and L2 is coaxially with, or in parallel with, the axial line X2 of the lens L3. The guide shaft GS and drive shaft DS extend in the form tilted with reference to the axial lines X1 and X2.

An external drive circuit (not illustrated) for applying voltage through the wire H is arranged provided in order to control the drive of the piezoelectric actuator PZ by receiving a signal (position information). This signal is supplied from an encoder (not illustrated; a position information acquisition means; for example, an array of magnetic information is loaded on the guide shaft GS and a scan head is mounted on the lens holder HD), and this encoder is used to magnetically detect the traveling distance of the lens holder HD. The piezoelectric actuator PZ, drive shaft DS and lens holder HD constitute a drive means. The drive circuit may be mounted on the base B and may be connected by wiring.

Figure 5:
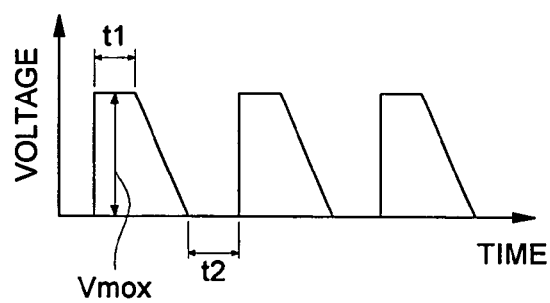
FIG. 5 is a drawing representing the waveform of the piezoelectric pulse applied to the piezoelectric actuator PZ.
Figure 5:
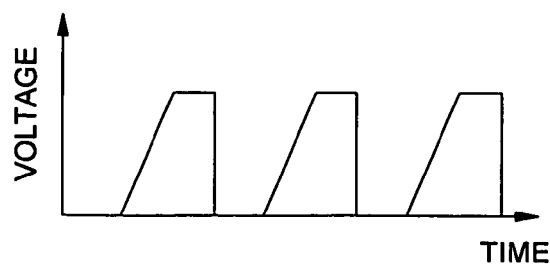
Figure 6:
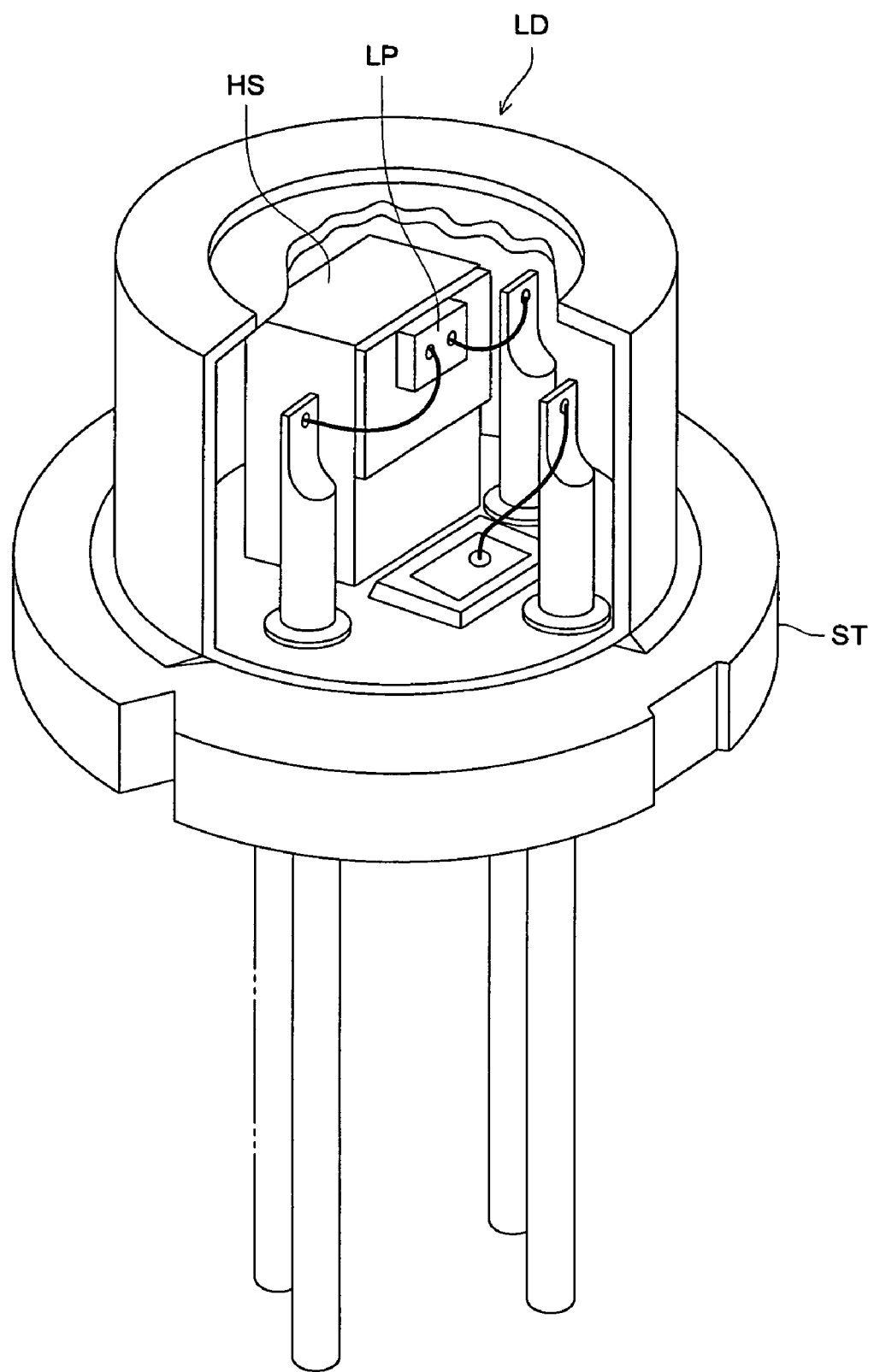
FIG. 6 is a perspective view of an example of a 2-laser 1-package.

The following describes how to drive the lenses L1 and L2 by the optical system unit CU: Generally, when voltage has been applied, the piezoelectric actuator PZ is characterized by a small displacement but a high degree of generation force and response. Accordingly, as shown in FIG. 5(*a*), when approximate sawtooth pulse voltage characterized by a sharp rise and a flow fall is applied, the piezoelectric actuator PZ exhibits rapid expansion at the rise time of the pulse and slow contraction at the fall time of the pulse. Therefore, when the piezoelectric actuator PZ extends, the drive shaft DS is pushed out toward the front portion of FIG. 3 by the impact thereof. The lens holder HD for holding the lenses L1 and L2 do not move together with the drive shaft DS due to the inertia. A slip occurs between the drive shaft DS and drive aperture DA, and the lens holder HD remains at that position (with a slight travel in some cases). In the meantime, the drive shaft DS returns more slowly at the fall time of the pulse than at the rise time. The drive aperture DA does not slip with respect to the drive shaft DS, but moves integrally with the drive aperture DA toward the deeper side (wall W side) of FIG. 3. To be more specific, when the pulse preset to a frequency of a few hundred through a few tens of thousand Hz, the lens holder HD can be moved continuously at a desired speed. As will be clear from the above, the pulse of slow rise and sharp fall is applied, as shown in FIG. 5(*b*). This arrangement allows the lens holder HD to be moved in the opposite direction. Especially in the present embodiment, the guide shaft GS is tilted with respect to the axial lines X1 and X2, and therefore, the lenses L1 and L2 moves in the direction of optical axis as well as in the direction orthogonal to the optical axis, with respect to lens L3.

The optical pickup apparatus according to the present embodiment is capable of recording/reproduction of information using three different types of optical discs—high-density DVD, DVD and CD. In this case, spherical aberration occurs due to condensation of light on the information recording surface, caused by the difference in thicknesses of the protective layers of these optical discs. According to the present embodiment, the lenses L1 and L2 of the collimator optical system COL is moved in the direction of optical axis in response to the optical disc to be used, and the divergence angle of the light beams passing through is changed. In this manner, after correcting spherical aberration caused by the difference in thicknesses of the protective layers of these optical discs, the optical pickup apparatus provides recording/reproduction of information. Further, the optical axis of the lenses L1 and L2 is appropriately shifted in the direction orthogonal to the optical axis of the lens L3, in response to switching between emission points of the 2-laser 1-package. This arrangement provides simultaneous control of the coma aberration resulting from the light beams from the emission point deviated from the standard optical axis in the 2-laser 1-package 2LIP, for example. Further, the drive section of the present embodiment is characterized by comparatively low cost and small structure, thereby contributing to ensure a reduced cost and compact structure of the optical pickup apparatus.

Further, distribution of the rim intensity of the optical spot can be changed as desired by driving the lenses L1 and L2 of the collimator optical system COL. A zoom collimate lens, expander lens and zoom expander lens may be used, instead of the collimator optical system COL (also called the collimate lens).

In the aforementioned correction of spherical aberration, it is also possible to arrange such a configuration that spherical aberration detecting means (not illustrated) detects the current aberration according to the signal coming from the light detector PD for receiving the light reflected from the information recording surface of the optical disc, and controls the drive of the piezoelectric actuator PZ so as to reduce the aberration.

As shown in FIG. 3, a stopper SP as an anchoring member is provided on the top surface of the base B to cause mechanical contact at the traveling end of the lens holder HD. This procedure allows the lenses L1 and L2 to be positioned at the optimum site, without using the position information acquisition means. Further, the lenses can be held in a stable manner. In this case, the stopper SP may be brought in contact with the lenses L1 and L2.

Figure 7:
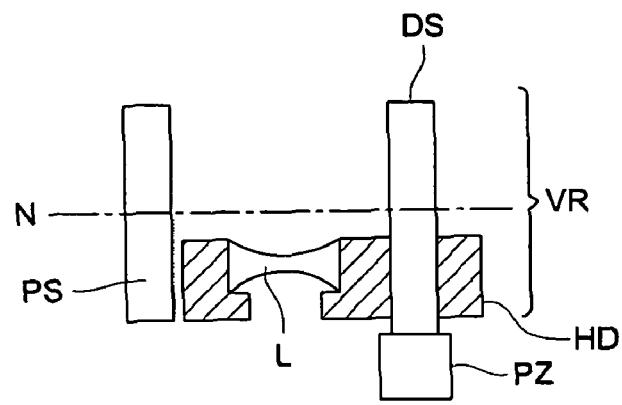
FIG. 7 is a schematic configuration diagram representing a collimator optical system as a variation of the embodiment of the present invention.

When the power supply is suspended by the user turning off the power source of the optical pickup apparatus, the lens holder HD is preferably brought to the side of the piezoelectric actuator PZ (e.g., as close as possible to the piezoelectric actuator PZ relative to the center of the movable range VR), as shown in FIG. 7, before the power is completed turned off. The drive shaft DS is supported by the piezoelectric actuator PZ largely at one end. If the optical pickup apparatus is subjected to some impact, an excessive moment may occur. However, the moment of the drive shaft DS is reduced and possible damage is avoided by moving the lens holder HD close to the piezoelectric actuator PZ (preferably by bring it in contact with the piezoelectric actuator PZ).

Figure 8:
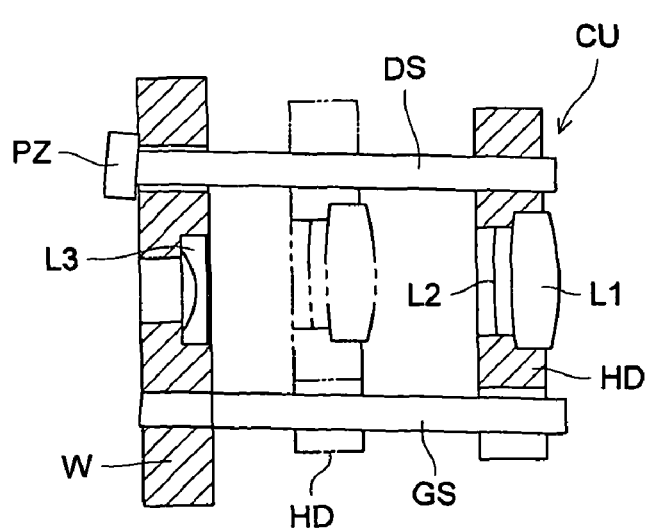
FIG. 8(a) is a front view of an optical system unit CU as another embodiment.
FIG. 8(b) is a drawing representing the configuration of FIG. 8(a) taken along the line VIIIB-VIIIB, as viewed in the arrow-marked direction.
Figure 8:
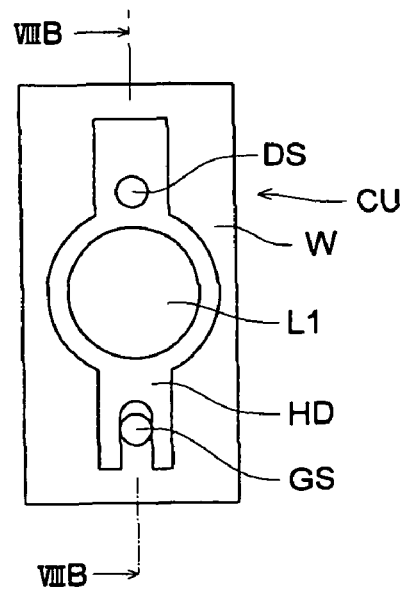

FIG. 8(*a*) is a front view of an optical system unit CU as another embodiment. FIG. 8(*b*) is a drawing representing the configuration of FIG. 8(*a*) taken along the line VIIIB-VIIIB, as viewed in the arrow-marked direction. In the present embodiment, the lenses L1 and L2 are arranged between the drive shaft DS and guide shaft GS. This is the only difference from the aforementioned embodiment. However, when the drive shaft DS and guide shaft GS is tilted in the direction perpendicular to the line VIIIB-VIIIB due to a problem with mechanical precision, the optical axis of the lenses L1 and L2 will deviate in the direction perpendicular to the line VIIIB-VIIIB. The present embodiment permits a greater space to be provided between the drive shaft DS and guide shaft GS than the space in the case of FIG. 3, with the result that the amount of deviation can be kept at a small value. Further, to ensure balance of force applied to the drive shaft DS and guide shaft GS, the structure is supported at both ends, according to the present embodiment.

FIG. 9(a) through FIG. 9(d) are drawings representing the front view of an optical system unit CU as still another embodiment of the present invention. FIG. 9(b) is a view representing the configuration of FIG. 9(a) taken along the line IXB-IXB as viewed in the arrow-marked direction. FIG. 9(c) is a side view of the optical system unit CU. In the present embodiment, the drive shaft DS and guide shaft GS extend in the direction perpendicular to the wall W, as viewed in the direction shown in FIG. 9(b). When viewed in the direction shown in FIG. 9(c), the guide shaft GS is shaped in the form of letter Z wherein the portions in the vicinity of both ends are parallel and the guide shaft GS is bent at an intermediate position. Accordingly, if the lens holder HD is located at the position indicated by the solid line in FIG. 9(c) (position apart from the wall W), the optical axes of the lenses L1 and L2 agree with that of the optical axis L3, as shown in FIG. 9(a). However, if the lens holder HD is located at the position indicated by the dotted line in FIG. 9(c) (position close to the wall W), the optical axes of the lenses L1 and L2 do not agree with that of the optical axis L3, as shown in FIG. 9(d). To put it another way, similarly to the case of the aforementioned embodiment, the lenses L1 and L2 can be moved in the direction of optical axis or in the direction orthogonal to the optical axis with respect to the lens L3 by the drive of the piezoelectric actuator PZ.

FIG. 10(a) is a front view of an optical system unit CU as a still further embodiment of the present invention. FIG. 16(b) is a view representing the configuration of FIG. 10(a) taken along the line XB-XB as viewed in the arrow-marked direction. In the present embodiment, the drive shaft DS and guide shaft GS extend in the direction perpendicular to the wall W. However, the lens holders are separated into two; the first lens holder HD1 driven by the drive shaft DS, and the second lens holder HD2 for supporting the lenses L1 and L2. The second lens holder HD2 is penetrated by two rods RD projecting from the first lens holder HD1, and is pressed by the spring SP. The second lens holder HD2 can be slid along a guide plate GP. When viewed in the direction of FIG. 10(b), the guide plate GP is shaped in the form of letter Z wherein both ends are parallel and the guide plate GP is bent at an intermediate position.

In the present embodiment, when the first lens holder HD1 is driven and moved by the piezoelectric actuator PZ, the second lens holder HD2 moves along the bent guide plate GP in response thereto. Similarly to the case of the aforementioned embodiment, the lenses L1 and L2 can be moved in the direction of optical axis or in the direction orthogonal to the optical axis with respect to the lens L3.

Figure 11:
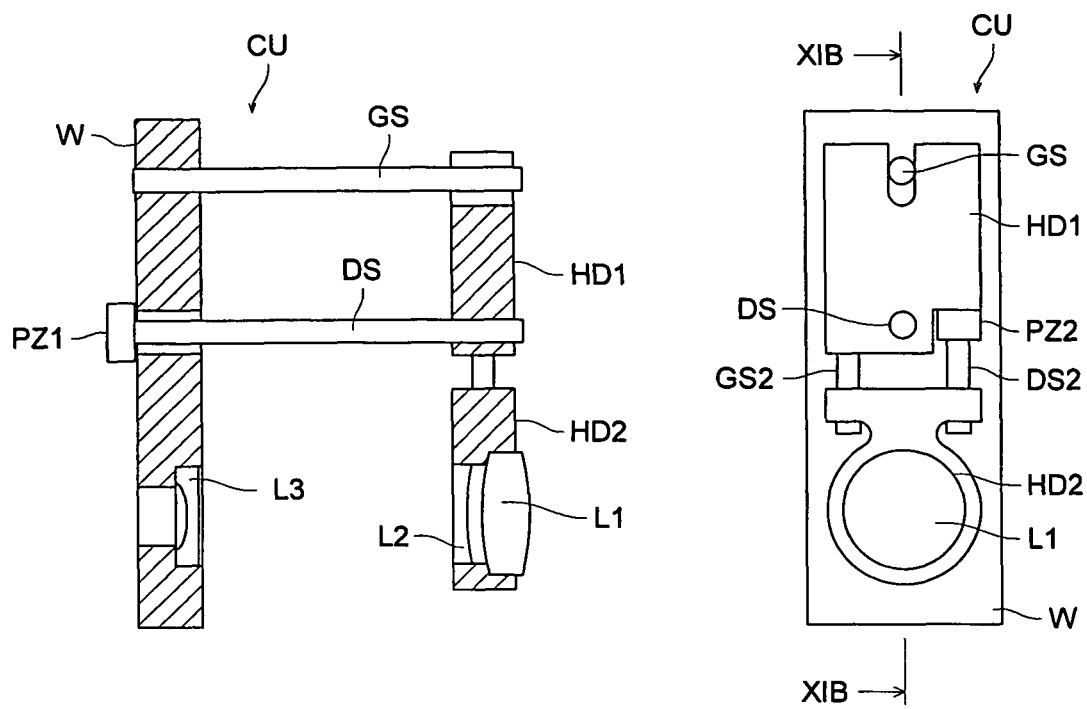
FIG. 11(a) is a front view of an optical system unit CU as a still further embodiment of the present invention.
FIG. 11(b) is a view representing the configuration of FIG. 11(a) taken along the line XIB-XIB as viewed in the arrow-marked direction.

FIG. 11(a) is a front view of an optical system unit CU as a still further embodiment of the present invention, and FIG. 11(b) is a view representing the configuration of FIG. 11(a) taken along the line XIB-XIB as viewed in the arrow-marked direction. In the present embodiment, the drive shaft DS and guide shaft GS extend in the direction perpendicular to the wall W. The lens holders are separated into two; the first lens holder HD1 driven by the drive shaft DS connected to the first piezoelectric actuator PZ1, and the second lens holder HD2 for supporting the lenses L1 and L2. However, the second lens holder HD2 is driven in the direction orthogonal to the optical axes of the lenses L1 and L2 by the second piezoelectric actuator PZ2 arranged on the second lens holder HD2, and by the second drive shaft DS2.

In the present embodiment, the first lens holder HD1 is driven and moved by the first piezoelectric actuator PZ1 through the first drive shaft DS1. In response to this operation, the second lens holder HD2 is driven and moved with reference to the first lens holder HD1 by second piezoelectric actuator PZ2 through the second drive shaft DS2. This procedure allows the lenses L1 and L2 to be moved in the direction of optical axis or in the direction orthogonal to the optical axis with respect to the lens L3, similarly to the case of the aforementioned embodiment.

In the optical system unit CU shown in FIGS. 3, 8 through 10, the locus of the movement of the lenses L1 and L2 is kept constant (wherein a constant locus is generated by the main point of the optical device). In the optical system unit CU given in FIG. 11, a desired locus can be generated by independent drive of the first piezoelectric actuator PZ1 and second piezoelectric actuator PZ2. To put it another way, driving of the second piezoelectric actuator PZ2 alone allows the lenses L1 and L2 to be moved in the direction orthogonal to the optical axis alone with respect to the lens L3. To be more specific, based on the signal coming from the light detector (not illustrated) having received the light reflected from the optical disc, the signal output section (not illustrated) detects the amounts of spherical aberration and coma aberration. In this case, independent aberration control is provided as follows: By controlling the drive of the first piezoelectric actuator PZ1, the lenses L1 and L2 are moved in the direction of optical axis in conformity to the amount of spherical aberration having been detected; whereas, by controlling the drive of the second piezoelectric actuator PZ2, the lenses L1 and L2 are moved in the direction orthogonal to the optical axis in conformity to the amount of coma aberration having been detected.

The following describes the case of spherical aberration: Some type of optical disc has two information recording surfaces. The information recording surface of this optical disc has a different thickness of the protective layer. This difference causes spherical aberration to be generated in the light beams condensed on the information recording surface. According to the present embodiment, in this case, the lenses L1 and L2 are moved in the direction of optical axis in conformity to the information recording surface for recording/reproduction of information, and the divergence angle of the light beams passing through is changed, whereby recording/reproduction of information is performed after the spherical aberration has been corrected. The drive section of the present embodiment has a high degree of responsibility, and hence is sufficiently applicable in the case of random access to both layers of the dual-structured DVD, for example, in the optical pickup apparatus mounted on a PC. Further, spherical aberration resulting from the difference in the thickness of the protective layer per rotation of the optical disc can be adequately corrected by driving lenses L1 and L2 at a high degree of response speed.

Further, when the objective lens OBJ is formed of the plastic material having a comparatively great index of refraction with reference to temperature, spherical aberration occurs to the light beams condensed on the information recording surface of the optical disc, in response to a change in the ambient temperature. In this case, based on the signal coming from the temperature sensor (not illustrated), the lenses L1 and L2 are moved in the direction of optical axis and the divergence angle of the light beams passing through is changed, whereby recording/reproduction of information is performed after the spherical aberration has been corrected.

When using the light source formed on one package, wherein light beams of three wavelengths—405 nm (for DB), 655 nm (for DVD) and 780 nm (for CD)—are emitted from three emission points, at least two emission points are located outside the optical axis. Use of the aforementioned embodiment allows the spherical aberration and coma aberration to be corrected. Especially when the crank structure shown in FIGS. 9 and 10 (i.e. refraction of guide shaft GS) is applied to the optical pickup apparatus using the aforementioned light source, a three-step crank structure is arranged. This arrangement allows the spherical aberration and coma aberration to be corrected for all the light beams coming from three emission points. Further, without being restricted to two-step or three-step arrangement, the crank structure can be designed in four- or more step structure, as required.

For example, in the case of the crank mechanism as illustrated in FIGS. 9 and 10, the lenses L1 and L2 are moved in the area where the traveling direction is parallel to the optical axis of the optical pickup apparatus. This procedure corrects the spherical aberration caused by the difference in the thickness of the protective layer of one and same optical disc or the irregularity in the thickness of the protective layer according to the particular location of the same optical disc, without deteriorating the coma aberration. Even when the lenses L1 and L2 are moved obliquely with respect to the optical axis as shown in FIG. 8, the angle formed by the traveling direction and optical axis is reduced. This procedure reduces deterioration of coma aberration when correcting the spherical aberration caused by the difference in the thickness of the protective layer of one and same optical disc or the irregularity in the thickness of the protective layer according to the particular location of the same optical disc.

Figure 12:
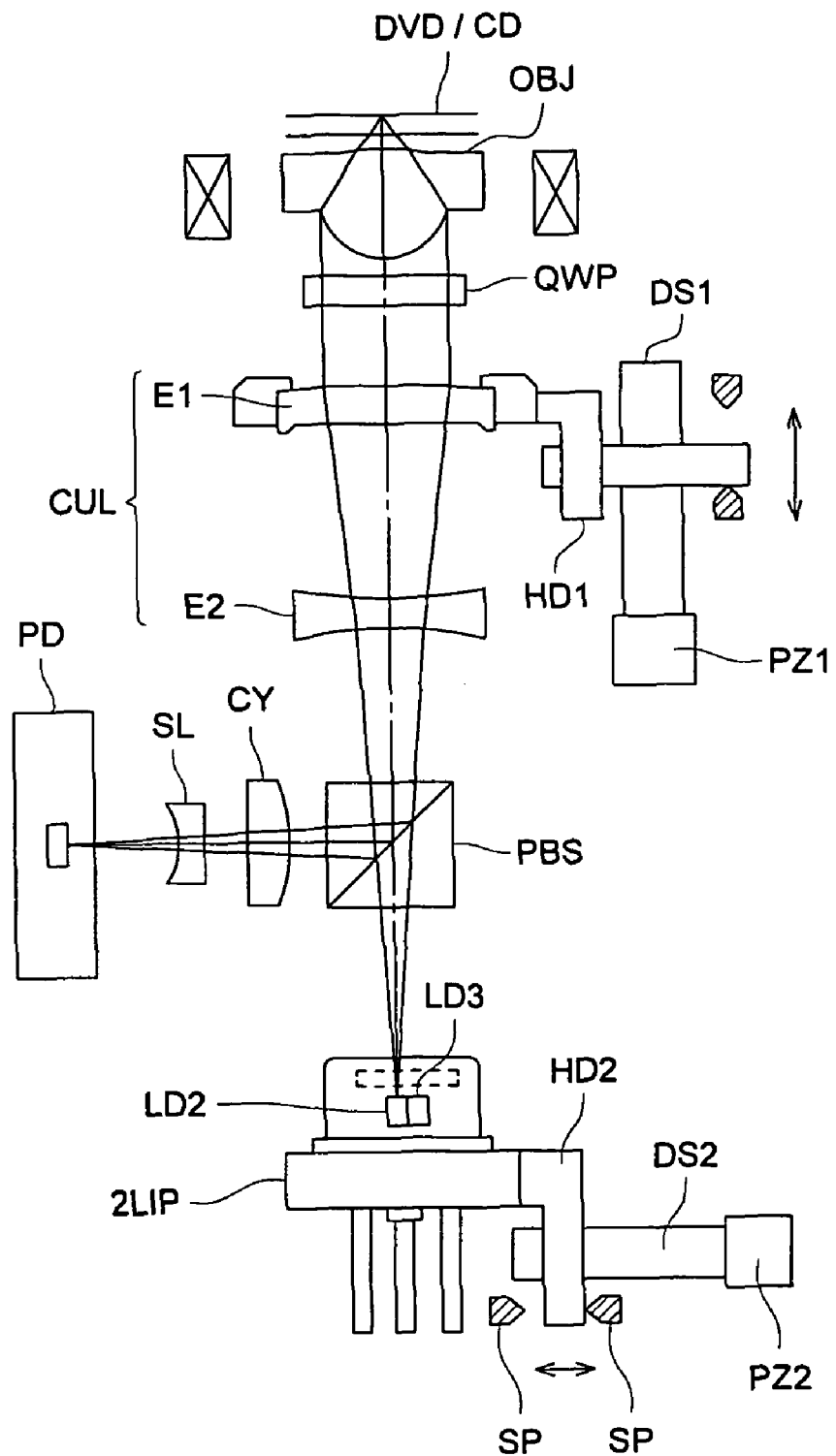
FIG. 12 is a schematic configuration diagram of an optical pickup apparatus as a second embodiment capable of recording/reproduction of information using a DVD and CD.

FIG. 12 is a schematic configuration diagram of an optical pickup apparatus as a second embodiment capable of recording/reproduction of information using a DVD and CD. The present embodiment uses the so-called 2-laser 1-package 2LIP composed of the second semiconductor laser LD2 and third semiconductor laser LD3 incorporated in one and the same package or fixed to one and the same heatsink.

The 2-laser 1-package 2LIP is secured on the lens holder HD2, and the lens holder HD2 is driven in the direction orthogonal to the optical axis by the second piezoelectric actuator PZ2 secured on a frame (not illustrated) through the drive shaft DS2. To put it another way, the 2-laser 1-package 2LIP as a light source can be moved in the direction orthogonal to the optical axis.

When recording/reproduction of information is performed using a DVD, the 2-laser 1-package 2LIP is moved in such a way that the axial line of the light beams emitted from the second semiconductor laser LD2 (emission point) of the 2-laser 1-package 2LIP will agree with the optical axis of the objective lens OBJ, as shown in FIG. 12. The light beams emitted from the second semiconductor laser LD2 (wavelength $\lambda 2$=600 nm through 700 nm) of the 2-laser 1-package 2LIP passes through the polarized beam splitter PBS and enters the coupling lens CUL to become parallel light beams. The lens E1 as one of the lenses E1 and E2 constituting the coupling lens CUL (which may be composed of a single lens) is secured on the lens holder HD1, which is moved in the direction of optical axis by the piezoelectric actuator PZ1 fixed on the frame (not illustrated) through the drive shaft DS1. When recording/reproduction of information is performed using a DVD, the lens E1 moves to the laser light source side.

Passing through the quarter wave plate QWP, the light beams emitted from the coupling lens CUL is condensed by the objective lens OBJ. It is condensed on the information recording surface through the protective layer of the DVD (thickness t2=0.5 through 0.7 mm) and a condensed spot is formed in this position.

The light beams modulated and reflected by the information pit on the information recording surface again passes through the objective lens OBJ and quarter wave plate QWP, and is reflected by the polarized beam splitter PBS. Then it enters the light receiving surface of the light detector PD through the cylindrical lens CY and sense lens SL. Thus, a signal scanning the information recorded on the DVD can be captured using the output signal.

A change in the amount of light resulting from a change in the shape and position of the spot on the light detector PD is detected. This is followed by the step of detecting the focusing and track. Based on the results of detection, the 2D actuator AC drives the objective lens OBJ so that the light beams from the second semiconductor laser LD2 forms an image on the DVD information recording surface.

When recording/reproduction of information is performed using a CD, the second piezoelectric actuator PZ2 is moved from the position shown in FIG. 12. This procedure allows the 2-laser 1-package 2LIP to be moved in such a way that the third semiconductor laser LD3 (emission point) of the 2-laser 1-package 2LIP is located on the optical axis.

The light beams emitted from the third semiconductor laser LD3 (wavelength $\lambda 3$=750 nm through 850 nm) of the 2-laser 1-package 2LIP passes through the polarized beam splitter PBS and enters the coupling lens CUL. In this case, the lens E1 is moved to the optical disc side by driving the piezoelectric actuator PZ1. This operation corrects the spherical aberration resulting from the difference in the thickness of the protective layer between the DVD and CD, wherein the light beams emitted from the coupling lens CUL is used as a finite divergence light beams.

Passing through the quarter wave plate QWP, the finite divergence light beams coming from the coupling lens CUL is condensed by the objective lens OBJ. It is condensed on the information recording surface through the protective layer of the CD (thickness t3=1.1 mm through 1.3 mm) and a condensed spot is formed in this position.

The light beams modulated and reflected by the information pit on the information recording surface again passes through the objective lens OBJ and quarter wave plate QWP, and is reflected by the polarized beam splitter PBS. Then it enters the light receiving surface of the light detector PD through the cylindrical lens CY and sense lens SL. Thus, a signal scanning the information recorded on the DVD can be captured using the output signal.

A change in the amount of light resulting from a change in the shape and position of the spot on the light detector PD is detected. This is followed by the step of detecting the focusing and track. Based on the results of detection, the 2D actuator AC drives the objective lens OBJ so that the light beams from the third semiconductor laser LD3 forms an image on the CD information recording surface.

In an optical pickup apparatus based on the so-called 2-wavelength compatible objective lens wherein recording/reproduction of information is performed using two or more different types of optical discs such as DVD and CD, the 2-laser 1-package 2LIP integrally incorporating the semiconductor laser LD2 used in the DVD and semiconductor laser LD3 used in the CD is utilized. This arrangement solves the problem of axial deviation between the emission point for DVD secured on one and the same heatsink and that for CD, and at the same time, allows infinite parallel light beams to be applied when the DVD is used, and finite parallel light beams to be applied when the CD is used. When the drive section shown in FIGS. 3 and, 8 through 10 is used to drive the 2-laser 1-package 2LIP, movement in the optically axial direction can be achieved only by a mechanical configuration.

The 2-laser 1-package 2LIP as a light source (which may be composed of a single light source) may be driven and rotated, wherein the main point of the coupling lens CUL is used as a center. This arrangement allows coma aberration to be corrected, without changing the distribution of the intensity of optical spot.

As shown in FIG. 12, a stopper SP as an anchoring member is provide to cause mechanical contact at the traveling end of the laser holder HD. This procedure allows the 2-laser 1-package 2LIP to be positioned at the optimum site, without using the position information acquisition means. It also ensures stable holding. In this case, the stopper SP may be brought in contact with the 2-laser 1-package 2LIP.

Similarly to the configuration of FIG. 7, when the power supply is suspended by the user turning off the power source of the optical pickup apparatus, the laser holder HD2 is preferably brought to the side of the piezoelectric actuator PZ2 (e.g., as close as possible to the piezoelectric actuator PZ2 relative to the center of the movable range), before the power is completed turned off. The drive shaft DS2 is supported by the piezoelectric actuator PZ2 largely at one end. If the optical pickup apparatus is subjected to some impact, an excessive moment may occur. However, the moment of the drive shaft DS2 is reduced and possible damage is avoided by moving the laser holder HD2 close to the piezoelectric actuator PZ2 (preferably by bring it in contact with the piezoelectric actuator PZ2).

The present invention has been described with reference to various embodiments. It is to be expressly understood, however, that the present invention is not restricted thereto. The present invention can be embodied in a great number of variations with appropriate modification or additions. For example, the 2-laser 1-package may be formed of a combination between the first semiconductor laser LD1 and second semiconductor laser LD2. A stepping motor, voice coil motor and shape memory alloy may be used for the drive section, regardless of the aforementioned embodiment.

What is claimed is:

1. An optical pickup apparatus for at least one of recording information onto an information recording surface and reproducing information from the information recording surface, the optical pickup apparatus comprising:
    a laser light source;
    an objective lens configured to converge light beams from the laser light source onto the information recording surface through a protective layer of an optical information recording medium;
    an optical device configured to converge a divergence angle of incident light beams by moving in an optical axis direction of the optical device, the optical device being arranged between the laser light source and the objective lens;
    a light receiving device configured to receive light beams reflected by the information recording surface and passed through the objective lens; and
    a driving device configured to move the optical device in a direction crossing the optical axis, the driving device comprising:
        a drive source;
        a driven member mounted on the drive source;
        a movable member holding the optical device, the movable member being engaged with the driven member to be movable in the direction crossing the optical axis; and
        a guide member engaged with the movable member, the guide member being configured to guide the movable member in the direction crossing the optical axis.

2. The optical pickup apparatus of claim 1, wherein, the driving device comprises an electromechanical transducer, a driving member fixed to one end of the electromechanical transducer and a movable member movably held on the driving member; and wherein the electromagnetic transducer is arranged to move the movable member by repeated expansion and contraction of the electromechanical transducer at different speeds in a direction of expansion and contraction.

3. The optical pickup apparatus of claim 1, wherein the optical device includes at least one lens and the divergence angle of light beams entering to the objective lens is changed by moving the lens.

4. The optical pickup apparatus of claim 1, wherein the laser light source includes a plurality of emission points including at least one emission point arranged apart from an optical axis of the laser light source, the plurality of emission points emitting light beams having mutually different wavelengths; and wherein the light beams having mutually different wavelengths are respectively converged on the information recording surface of the optical information density, whereby recording and/or reproducing of information is carried out.

5. The optical pickup apparatus of claim 4, wherein, the plurality of emission points emits light beams having at least two wavelengths out of:
    first light beams having a first wavelength $\lambda 1=380$ nm through 450 nm for recording and/or reproducing the information using the first optical information recording medium having a protective layer thickness $t1=0.09$ through 0.11 or 0.55 through 0.65;
    second light beams having a second wavelength $\lambda 2=600$ nm through 700 nm for recording and/or reproducing the information using the second optical information recording medium having a protective layer thickness $t2=0.55$ through 0.65; and
    third light beams having a third wavelength $\lambda 3=750$ nm through 850 nm for recording and/or reproducing the information using the third optical information recording medium having a protective layer thickness $t3=1.1$ through 1.3.

6. The optical pickup apparatus of claim 1, further comprising:
    a signal output device for receiving light beams reflected by the information recording surface of the optical information recording medium and outputting signal of a spherical aberration of a light beam spot where an image is formed on the information recording surface of the optical information recording medium,
    wherein the driving device performs a drive operation to move the optical device in response to the signal of the spherical aberration outputted from the signal output device.

7. The optical pickup apparatus of claim 1, wherein the driving device simultaneously moves at least one lens of the optical device in a optical axis direction of the optical device and a direction crossing to the optical axis direction of the optical device in response to switching the emitting point emitting the laser beams.

8. The optical pickup apparatus of claim 1, wherein the driving device moves at least one lens of the optical device in a optical axis direction of the optical device and a direction crossing to the optical axis direction in response to switching an emitting point for emitting the laser beams, so that a position of the lens subsequent the movement is shifted in the optical axis direction and in a direction crossing to the optical axis comparing to a position of the lens prior to the movement.

9. The optical pickup apparatus of claim 1, wherein the optical device is a collimator lens or a collimator lens group for changing a divergent angle of the light beams emitted from the laser light source.

10. The optical pickup apparatus of claim 1, wherein the optical device is a collimator lens or a collimator lens group for ,converting divergent light beams emitted from the laser light source into approximately parallel light beams.

11. The optical pickup apparatus of claim 1, wherein the optical device is an expander lens or an expander lens group for increasing a diameter of the light beams from the laser light source.

12. The optical pickup apparatus of claim 1, wherein the optical device is a zoom expander lens or a zoom expander lens group for increasing or decreasing a diameter of the light beams from the laser light source.

13. The optical pickup apparatus of claim 1, wherein the optical device changes a distribution of rim intensity of a light beam spot formed on the information recording surface.

14. The optical pickup apparatus of claim 1, further comprising: an anchoring member for hitting a moving lens of the optical device at an end of a traveling range of the moving lens.

15. A lens moving apparatus for moving an optical device of an optical pickup apparatus for at least one of recording information onto an information recording surface and reproducing information from the information recording surface, the optical pickup apparatus including
a laser light source and
an objective lens configured to converge light beams from the laser light source onto the information recording surface through a protective layer of an optical information recording medium, the optical device being arranged between the laser light source and the objective lens; the lens moving apparatus comprising:
a first driving device configured to move the optical device in a first direction; and
a second driving device configured to move the optical device in a second direction across the first direction wherein the optical device is held by a lens holder; and
wherein the lens holder includes a first lens holder and a second lens holder, the first lens holder being moved by the first driving device in the first direction and the second lens holder being moved by the second driving device in the second direction against the first lens holder.

16. The lens moving apparatus of the optical pickup apparatus of claim 15, further comprising:
a first guide member configured to guide the first lens holder in the first direction; and
a second guide member configured to guide the second lens holder in the second direction, the second guide member being arranged in the first lens holder,
wherein the first driving device moves the first lens holder along the first guide member and the second driving member moves the second lens holder along the second guide member against the first lens holder.

17. The lens moving apparatus of the optical pickup apparatus of claim 16, wherein the first guide member and the second guide member are arranged so that the first direction is parallel to a surface parallel to an optical axis of the objective lens and an optical axis of the optical device, and the second direction crosses at a right angle to the surface parallel to the optical axis of the objective lens and the optical axis of the optical device.

18. The lens moving apparatus of the optical pickup apparatus of claim 15, wherein, the first driving device and the second driving device comprise an electromechanical transducer, a driving member fixed to one end of the electromechanical transducer and a movable member movably held on the driving member; and wherein the electromagnetic transducer is arranged to move the movable member by repeated expansion and contraction of the electromechanical transducer at different speeds in a direction of expansion and contraction.

* * * * *